(12) United States Patent
Konda et al.

(10) Patent No.: US 8,130,288 B2
(45) Date of Patent: Mar. 6, 2012

(54) IMAGE PROCESSING APPARATUS

(75) Inventors: Tomoko Konda, Tokyo (JP); Yoshiyuki Fujii, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1734 days.

(21) Appl. No.: 11/304,615

(22) Filed: Dec. 16, 2005

(65) Prior Publication Data

US 2007/0013793 A1 Jan. 18, 2007

(30) Foreign Application Priority Data

Jul. 15, 2005 (JP) ................................ 2005-206718

(51) Int. Cl.
H04N 5/217 (2011.01)
H04N 7/18 (2006.01)

(52) U.S. Cl. ...................................... 348/241; 348/148

(58) Field of Classification Search .................. 348/135, 348/143, 148, 251, 243, 241, 238, 236
See application file for complete search history.

(56) References Cited

U.S. PATENT DOCUMENTS

| | | | | |
|---|---|---|---|---|
| 6,218,960 B1 * | 4/2001 | Ishikawa et al. | ............... | 340/901 |
| 6,781,625 B2 * | 8/2004 | Hayashi | ............... | 348/252 |
| 6,911,997 B1 * | 6/2005 | Okamoto et al. | ............... | 348/148 |
| 7,417,669 B2 * | 8/2008 | Kurane | ............... | 348/222.1 |
| 7,432,965 B2 * | 10/2008 | Mori | ............... | 348/243 |
| 2002/0047934 A1 * | 4/2002 | Nitta et al. | ............... | 348/689 |
| 2004/0027469 A1 * | 2/2004 | Tsuruoka | ............... | 348/241 |
| 2004/0080286 A1 * | 4/2004 | Moribe et al. | ............... | 315/386 |
| 2006/0007507 A1 * | 1/2006 | Inaba et al. | ............... | 358/474 |

FOREIGN PATENT DOCUMENTS

| | | | |
|---|---|---|---|
| JP | 07-077433 | A | 6/1993 |
| JP | 10-174002 | A | 12/1996 |
| JP | 2005-157731 | A | 11/2003 |
| JP | 2004-080168 | A | 3/2004 |
| JP | 2004-120492 | A | 4/2004 |

* cited by examiner

*Primary Examiner* — Lin Ye
*Assistant Examiner* — Euel Cowan
(74) *Attorney, Agent, or Firm* — Sughrue Mion, PLLC

(57) ABSTRACT

An image processing apparatus includes a QV converter that converts an electric charge accumulated in an effective pixel portion into an analog video signal and also converts an electric charge of a shaded pixel portion into an analog shaded signal, a signal processing section that processes output signals of the QV converter, a black level setting section that sets a black level from a black level target value, an A/D conversion section that A/D converts an analog output signal of the signal processing section after correction thereof by the black level, a CPU that processes a digital output signal D from the A/D conversion section, a noise determination section that determines a noise level from the digital output signal, a brightness measuring section that measures brightness information of a predetermined region, and a target value setting section that sets the black level target value based on the noise level and the brightness information.

11 Claims, 14 Drawing Sheets

IMAGE PROCESSING APPARATUS

BACKGROUND OF THE INVENTION

1. Field of the Invention

The present invention relates to an image processing apparatus provided with an image sensor comprising an effective pixel portion and a shaded pixel portion, and more particularly, it relates to a new technique to set the black level of the image sensor so as to improve image processing accuracy.

2. Description of the Related Art

In general, in image sensing devices, in order to suppress black floating and black level depression of a video signal (picked-up image) of an object to be sensed or picked up, there is required an image processing apparatus that always serves to correct the black level of the picked-up image.

For instance, in conventional image processing apparatuses, it is necessary to subtract a noise level due to a dark current (resulting from thermal noise of semiconductors) from the video signal so as to make the black level of the video signal constant (suppress black floating and black level depression). Accordingly, the video signal is corrected by referring to an output signal (hereinafter referred to as an "OB signal") from shaded pixels (hereinafter abbreviated as "OB") called an optical black to detect the dark current component.

In the above-mentioned prior art, there are provided, in a solid-state image sensor, an image pickup region formed of pixels to be photoelectrically converted and a shaded region (hereinafter referred to as an "OB portion") formed by shading pixels of the same structure as that of the image pickup region, and signal output portions from the respective regions are dc clamped so as to stabilize the black level.

As a result, even if the dark current is increased due to a temperature rise, a signal of the OB portion output from the solid-state image sensor is dc clamped through an OB clamp circuit to a reference voltage of the circuit, whereby the black level is held constant.

In addition, the OB clamp circuit is generally arranged at a preceding or upstream stage of a gain control circuit, so it is constructed such that a black level variation due to a gain change can be suppressed to a minimum.

In the conventional OB clamp circuit, however, the error of the clamp circuit is amplified at the time when the gain is increased, so the noise level can not be removed to a satisfactory extent, thus resulting in video images with a poor S/N (signal to noise) ratio.

Moreover, in order to accurately correct the black level when the gain is increased, it is necessary to correct the black level again after the increase of the gain has been completed, thus inviting a large increase in size and cost of the circuit.

Further, in the above-mentioned prior art, it is constructed such that the black floating and black level depression of the video signal (picked-up image) can always be suppressed accurately by focusing attention on the OB portion alone without considering the brightness of an external world (picture to be measured or imaged), so it is very difficult to perform correction while following the external world that is constantly changing.

Accordingly, in order to deal with the above-mentioned various problems, there has been proposed an image sensing device that includes an OB clamp circuit and an offset addition circuit, and serves to correct the black level by selecting an amount of offset corresponding to an ambient temperature based on a correction table stored in a CPU (see, for instance, a first patent document: Japanese patent application laid-open No. 2004-080168).

Also, another image sensing device has been proposed which includes an effective region into which incident light comes, a shading region which shades incident light, and a region with no light receiving element, and which corrects the black level by using parameters such as an exposure time, temperature data, etc., (see, for example, a second patent document: Japanese patent application laid-open No. 2004-120492). In this apparatus, the data of the region with no light receiving element is used for the purpose of correction.

In prior art image processing apparatuses such as, for example, those as described in the above-mentioned first and second patent documents, there is a problem that it is difficult to completely remove the noise level, for example, in case where the gain of a signal processing section is very large, thus making it impossible to achieve image processing with high precision.

In addition, in either of the conventional apparatuses described in the above-mentioned first and second patent documents, there is also another problem that it is necessary to provide a control section and a temperature sensor for controlling the black level in an accurate manner, thus resulting in an increase in the circuit size.

SUMMARY OF THE INVENTION

Accordingly, the present invention is intended to obviate the problems as referred to above, and has for its object to obtain an image processing apparatus with high accuracy which is not influenced by noise without increasing the circuit size and the arithmetic calculation size, by focusing attention on the fact that with respect to pictures for image processing, black floating and black level depression need not always be suppressed but the black level need only be set in accordance with image processing at a subsequent stage, measuring the brightness of a prescribed subject (an object to be sensed or picked up) from a video output signal of the subject so as to determine noise, and setting the black level by the use of a brightness average value and a noise level.

An image processing apparatus according to the present invention includes an effective pixel portion that accumulates an amount of first electric charge corresponding to an intensity of incident light from a subject; a shaded pixel portion that accumulates an amount of second electric charge, where the incident light is shaded from the subject; and a QV conversion part that converts the first and second electric charges into analog signals, respectively; a signal processing section that processes the analog signals to generate an analog output signal; and an A/D conversion section that converts the analog output signal into a digital output signal. The apparatus further includes: a noise determination section that determines a noise level from the analog signals or the analog output signal; a brightness measuring section that measures brightness information in a predetermined region of the subject from the analog signal or the analog output signal; a target value setting section that sets a black level target value for the analog output signal based on the noise level and the brightness information; and a black level setting section that sets a black level for the analog output signal based on the black level target value. The A/D conversion section converts the analog output signal corrected based on the black level into a digital output signal.

According to the present invention, it is possible to achieve highly accurate image processing without increasing the circuit size and calculation size as well as receiving any influence of noise.

In addition, the black level is set in accordance with the purpose of image processing, and the black level can be set in

DESCRIPTION OF THE PREFERRED EMBODIMENTS

Hereinafter, preferred embodiments of the present invention will be described while referring to the accompanying drawings.

Embodiment 1

Figure 1:
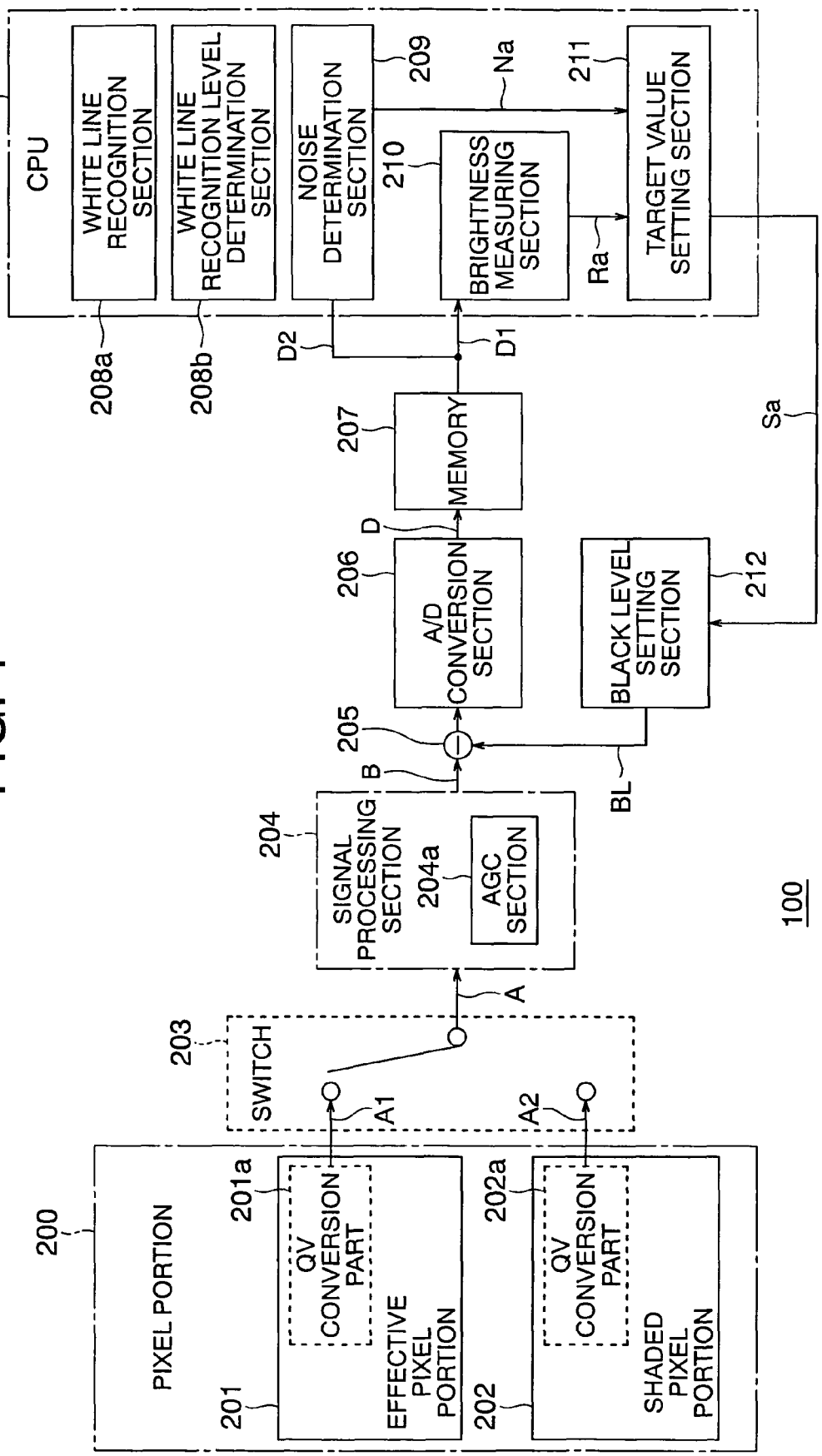
FIG. 1 is a block diagram showing the overall configuration of an image processing apparatus according to a first through a fourth embodiment of the present invention.

FIG. 1 is a block diagram that shows the schematic configuration of an image processing apparatus 100 according to a first embodiment of the present invention.

In FIG. 1, the image processing apparatus 100 includes a pixel portion 200, a switch 203, a signal processing section 204, a subtraction circuit 205, an A/D conversion section 206, a memory 207, a CPU 208, and a black level setting section 212.

The pixel portion 200 is composed of an image sensor to which a picture taken or picked up by a picture section (not shown) is projected, and has an effective pixel portion 201 and a shaded pixel portion 202.

The effective pixel portion 201 receives incident light from an unillustrated subject (an object to be sensed or picked up) and accumulates a first electric charge (hereinafter simply referred to as an "electric charge") corresponding to the amount of light of the incident light.

On the other hand, the shaded pixel portion 202 accumulates a second electric charge (hereinafter simply referred to as an "electric charge"), where the incident light is shaded from the subject.

In addition, the effective pixel portion 201 includes a QV conversion part 201a which serves to convert the electric charge accumulated in accordance with the amount of incident light into an analog video signal A1.

Similarly, the shaded pixel portion 202 includes a QV conversion part 202a which serves to convert an electric charge in a shaded state corresponding to a dark current into an analog shaded signal A2.

The switch 203 serves to switch between the respective outputs (the analog video signal A1 and the analog shaded signal A2) of the QV conversion parts 201a, 202a, and input them to the signal processing section 204 as an analog signal A.

That is, a luminance signal from the subject is converted into a voltage signal (analog video signal) by means of the QV conversion part 201a, and input to the signal processing part 204 through the switch 203.

On the other hand, the signal state of the shaded pixel portion 202 in a shaded state in which no incident light comes in (an initial state) is converted into a voltage signal (analog shaded signal A2) by means of the QV conversion part 202a, and input to the signal processing section 204 through the switch 203.

The QV conversion parts 201a, 202a may be constituted by a single integrated circuit.

The signal processing section 204 generates an analog output signal B and inputs it to one end of the subtraction circuit 205 by processing the analog signal A (the output signal of the QV conversion part 201a or 202a) selectively input thereto through the switch 203. The details of the signal processing section 204 will be described later.

A black level BL set by the black level setting section 212 is input to the other end of the subtraction circuit 205.

The subtraction circuit 205 corrects the analog output signal B from the signal processing section 204 by subtracting therefrom the black level BL and inputs it to the A/D conversion section 206.

The A/D conversion section 206 converts the analog output signal Bs collected by the black level from analog into digital form to generate a digital output signal D (i.e., a digital video output signal D1 to become image data or a digital shading output signal D2 to become shading data), which is then stored in the memory 207.

The CPU 208 connected to the memory 207 has not only a white line recognition section 208a and a white line recognition level determination section 208b but also a noise determination section 209, a brightness measuring section 210 and a target value setting section 211.

The white line recognition section 208a recognizes, for example, a white line in a road surface region based on the digital output signal D (i.e., the digital video output signal D1).

The white line recognition level determination section 208b determines a white line recognition level according to the white line recognition section 208a, as will be described later, and when a condition unable to recognize a white line has occurred more than a predetermined number of times, the processing of setting the black level BL is executed on the following video frame.

The noise determination section 209 processes the shading data (i.e., the digital shading output signal D2) of the digital output signal D in the memory 207, and inputs a data average value obtained in consideration of an offset to a target setting part 211 as a noise level Na (determination result).

The brightness measuring section 210 processes the image data (i.e., the digital video output signal D1) of the digital output signal D in the memory 207, measures the brightness of a predetermined region W (to be described later) of the subject, and inputs a brightness average value Ra (measurement result) to the target setting part 211 as brightness information.

The target value setting section 211 adds the noise level Na from the noise determination section 209 and the brightness average value Ra from the brightness measuring section 210 to each other thereby to set a black level target value Sa for the analog output signal B.

The black level setting section 212 sets the black level BL for the analog output signal B based on the black level target value Sa.

Hereinafter, the A/D conversion section 206 converts the analog output signal B corrected based on the black level BL into a digital output signal D.

Figure 2:
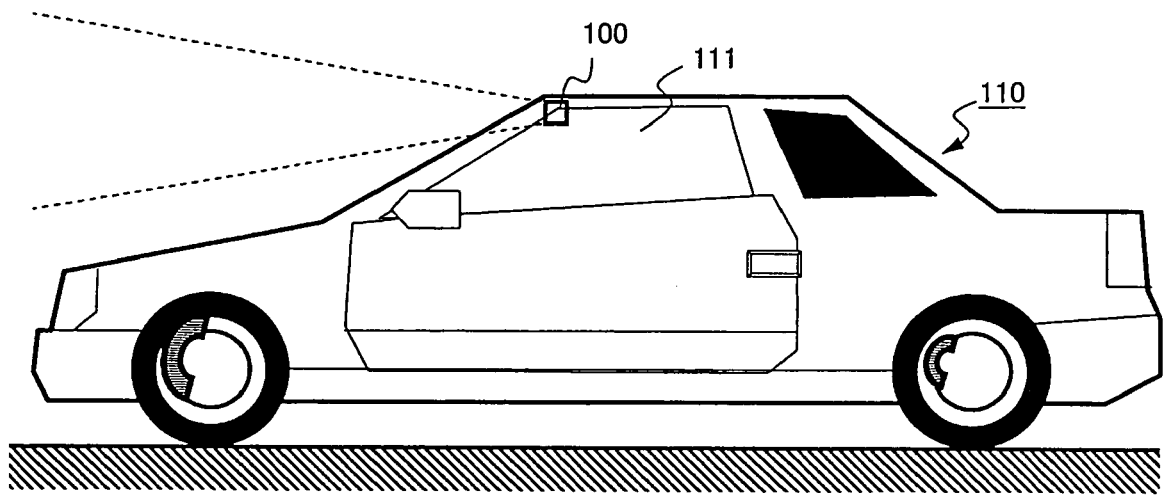
FIG. 2 is an external side elevational view showing an example in which the image processing apparatus according to the first embodiment of the present invention is installed on a vehicle.
Figure 3:
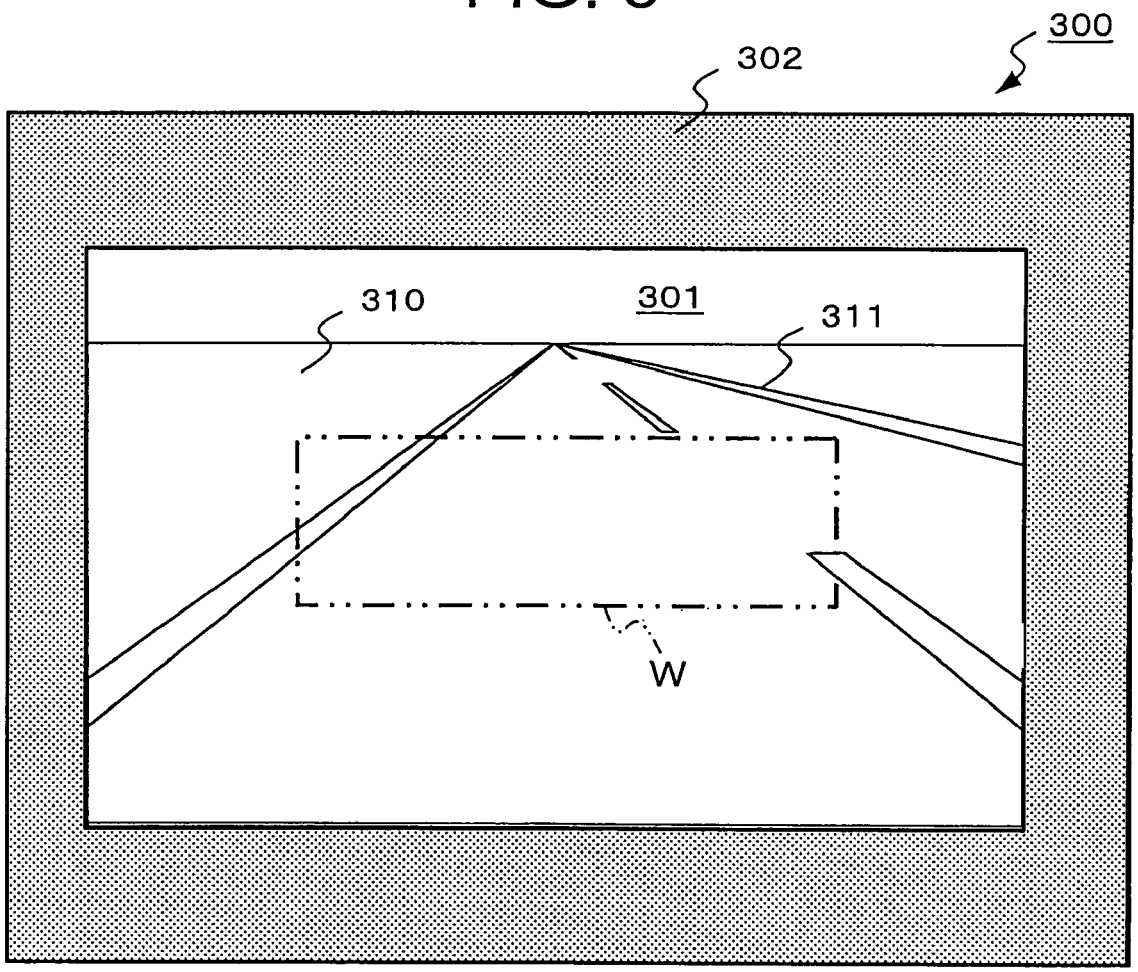
FIG. 3 is an explanatory view showing an example in which an image is taken or picked up by the image processing apparatus according to the first embodiment of the present invention.

FIG. 2 is an external side elevational view that shows an example in which the image processing apparatus 100 according to the first embodiment of the present invention is installed on a vehicle. FIG. 3 is an explanatory view that shows an example of a picture taken or picked up by the image processing apparatus 100.

In FIG. 2, the image processing apparatus 100 is arranged at a location in a passenger compartment 111 of a vehicle 110 in the vicinity of a rear view check mirror so as to take a picture of a road image forward of the vehicle 110.

In this case, the image processing apparatus 100 will acquire a picked-up image 300, as shown in FIG. 3.

Here, note that the image processing apparatus 100 may be arranged at a rear portion of the vehicle 110 so as to take a picture of a road image behind the vehicle 110.

In FIG. 3, the entire picked-up image 300 corresponds to the whole of the pixel portion 200 of the image processing apparatus 100. In addition, an effective image 301 corresponds to the effective pixel portion 201 in the pixel portion 200, and a shading image 302 corresponds to the shaded pixel portion 202 in the pixel portion 200.

The effective image 301 picked up by the effective pixel portion 201 includes a road surface 310 forward of the vehicle 110 and white lines 311 on the road surface 310.

The CPU 208 in the image processing apparatus 100 recognizes the white line 311 thus picked up for instance.

Also, the brightness measuring section 210 sets the predetermined region W shown in a window in FIG. 3 (alternate long and two short dashes line), and calculates, for example, the brightness average value Ra of the road surface 310 with the predetermined region W being made as a range to be measured.

Next, the operation of the first embodiment of the present invention will be explained while referring to FIGS. 1 through 3 together with FIGS. 4 through 6.

Figure 4:
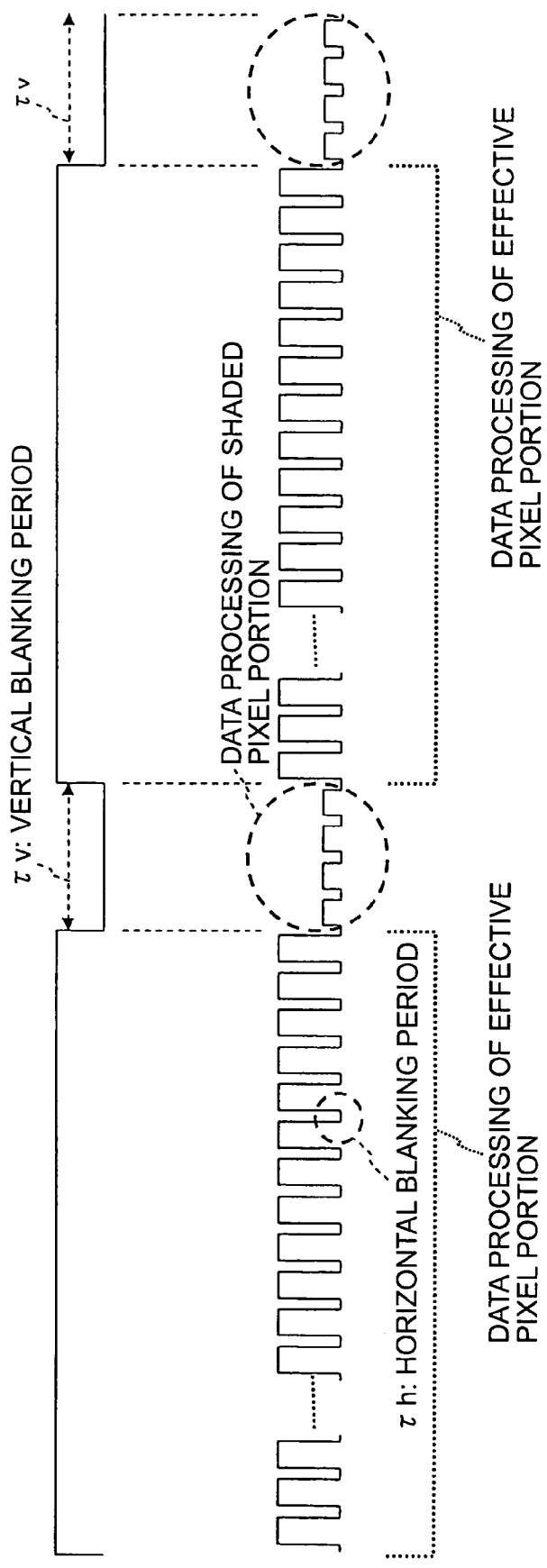
FIG. 4 is an explanatory view showing the data output timing of a shaded pixel portion and an effective pixel portion according to the image processing apparatus of the first embodiment of the present invention.

FIG. 4 is an explanatory view that shows, in a timing chart, the signal output operation of the pixel portion 200, wherein processing timing for the image data of the effective pixel portion 201 and the shaded pixel portion 202 is shown.

In FIG. 4, it is assumed that the data processing of the shaded pixel portion 202 is carried out in a vertical blanking period τv, and that the data processing of the effective pixel portion 201 is executed in an effective pixel data output period, i.e., in a data processing period (including a horizontal blanking period τh) of the effective pixel portion 201.

Figure 5:
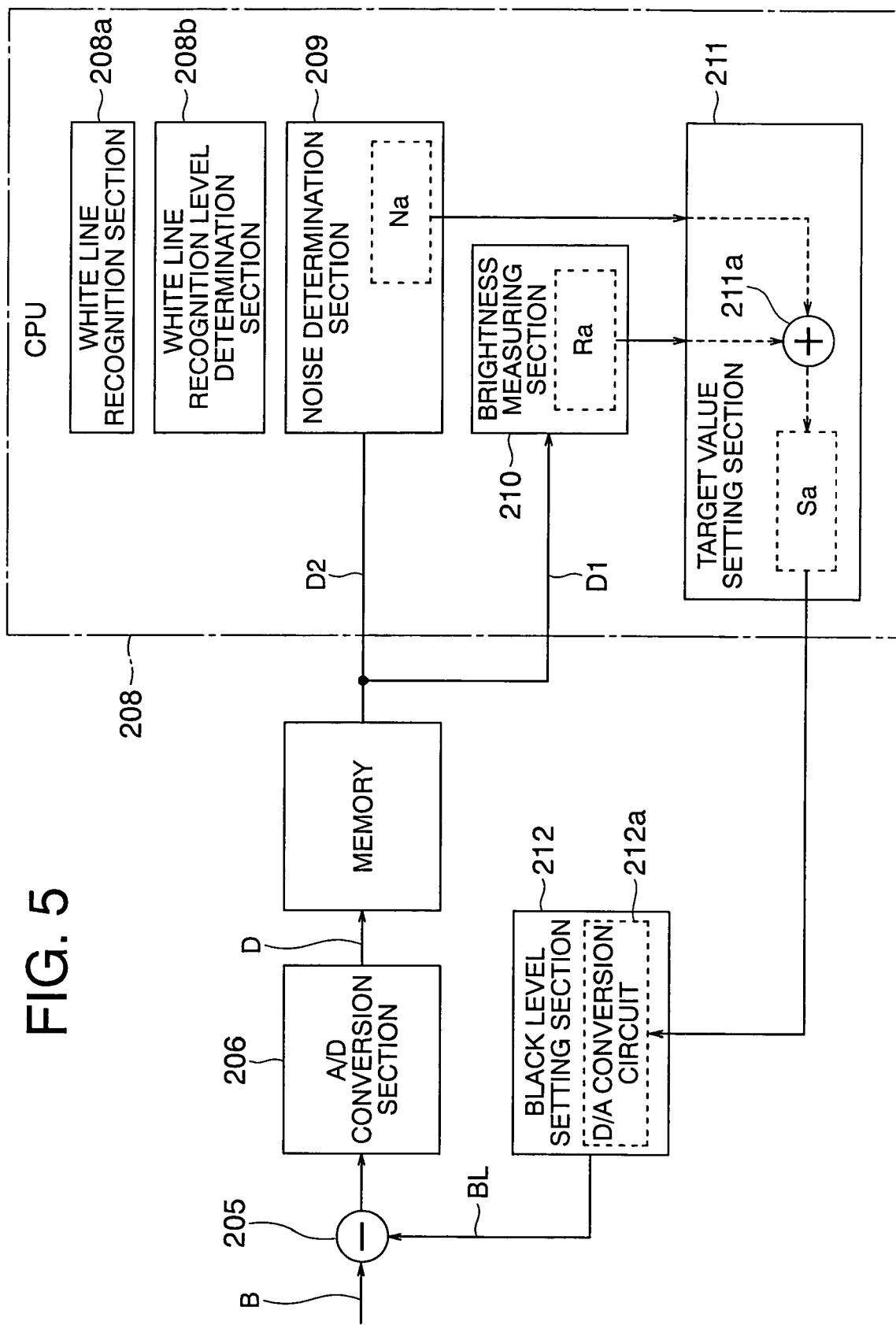
FIG. 5 is a block diagram specifically showing correlations among a noise determination section, a brightness measuring section, a target value setting section and a black level setting section according to the first embodiment of the present invention.

FIG. 5 is a block diagram that specifically shows correlations among the noise determination section 209, the brightness measuring section 210, the target value setting section 211 and the black level setting section 212 in FIG. 1.

In FIG. 5, the target value setting section 211 includes an addition circuit 211a that serves to add the noise level Na and the brightness average value Ra to each other to generate the black level target value Sa.

The black level setting section 212 includes a D/A (digital-to-analog) conversion circuit 212a that serves to D/A convert the black level target value Sa to generate the black level BL.

Figure 6:
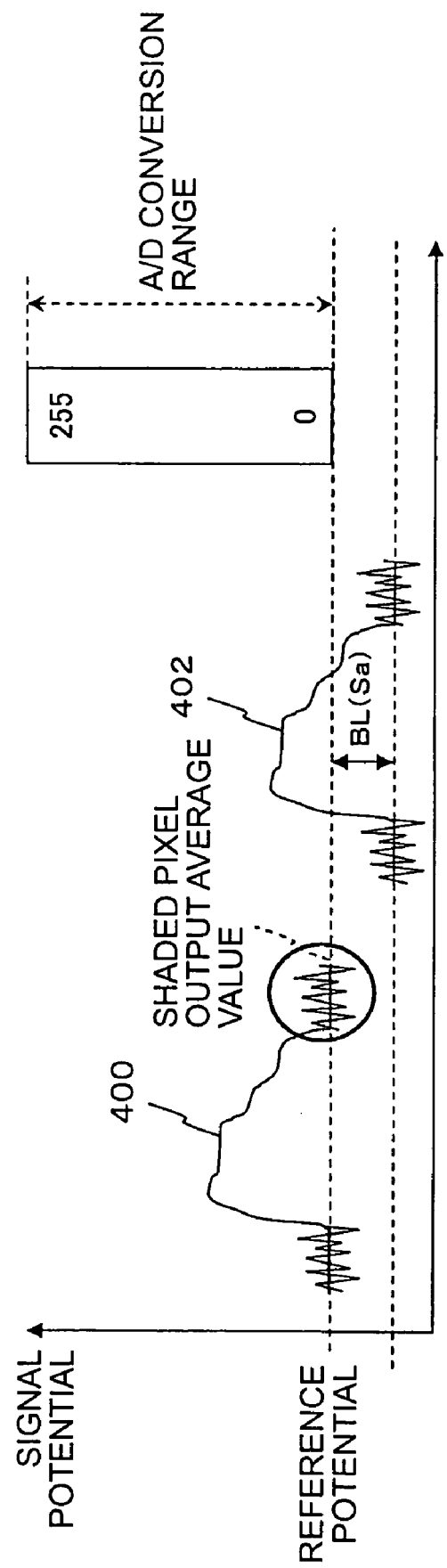
FIG. 6 is an explanatory view showing a relation between the black level setting section and an A/D conversion range according to the first embodiment of the present invention.

FIG. 6 is an explanatory view that illustrates the operation of the black level setting section 212 in association with the conversion range of the A/D conversion section 206 (8 bits: 0-255).

In FIG. 6, the black level BL based on the black level target value Sa is set such that the average value of a shaded pixel output of an imaged or picked-up signal 402 becomes a reference potential (0[LSB]) for A/D conversion, as indicated by a signal 400.

That is, in the prior art black level processing, the shaded pixel average value of the signal 400 is corrected to become a 0 level, but in the correction processing of the black level BL according to the first embodiment of the present invention, the signal potential of the signal 400 is A/D converted with the black level BL being subtracted (i.e., reduced by the black level target value Sa), as in the case of the signal 402.

In the block configuration of FIGS. 1 and 5, the subtraction circuit 205 is conveniently provided for easy understanding, but in the actual processing, it is general that the level of the signal 400 is not reduced but the A/D conversion range according to the A/D conversion section 206 is changed to substantially educe the signal level, as in the signal 402.

For instance, by changing the 8 bit A/D conversion range from a signal potential of 0.5-1.5 [V] (i.e., 0.5 [V] is 0 [LSB], and 1.5 [V] is 255 [LSB]) into a signal potential of 1.0-2.0 [V] (i.e., 1.0 [V] is 0 [LSB], and 2.0 [V] is 255 [LSB]), the signal level is substantially reduced by 0.5 [V].

The signal processing section 204 is composed, for example, of a CDS (Correlated Double Sampling) circuit, an AGC (Automatic Gain Control) section 204a, a γ correction circuit, a black level correction circuit, etc.

The QV conversion part 201a or 202a is selectively connected with an input terminal of the signal processing section 204 through the switch 203, so that an analog signal A (the analog video signal A1 or the analog shaded signal A2) output from the selected QV conversion part 201a or 202a is impressed on the input terminal of the signal processing section 204.

The switch 203 has a selection terminal thereof adapted to be switched over according to the timing of FIG. 4, so that the analog video signal A1 from the effective pixel portion 201 is input to the signal processing section 204 as the analog signal A in a horizontal portion ranking period τh, and the analog shaded signal A2 from the shaded pixel portion 202 is also input to the signal processing section 204 as the analog signal A in a vertical section ranking period τv.

The signal processing section 204 CDS processes the analog signal A in the CDS circuit, amplifies it by a predetermined gain G in the AGC section 204a, and then inputs it to the A/D conversion section 206 as an analog output signal B.

The CDS circuit and the AGC section 204a in the signal processing section 204 may execute general black level correction processing by using the analog shaded signal A2 from the QV conversion part 202a.

The analog signal A is processed by the respective circuits in the signal processing section 204 to become an analog output signal B, and it is further corrected by being subtracted by the black level BL set by the black level setting section 212, and thereafter it is converted into a digital output signal D by means of the A/D conversion section 206.

The black level BL is set by the D/A conversion circuit 212a in the black level setting section 212 based on the black level target value Sa set by the target value setting section 211 in the CPU 208.

The black level target value Sa is generated based on the digital conversion value (digital output signal D) of the analog output signal B which is obtained by processing the analog signal A (the analog video signal A1 and the analog shaded signal A2).

The analog shaded signal A2 processed by the respective circuits in the signal processing section 204 is corrected by being subtracted by the black level BL set by the black level setting section 212, and thereafter converted into a digital output signal D by means of the A/D conversion section 206.

At this time, it may be considered that the analog shaded signal A2 of a low intensity level is out of the A/D conversion range of the A/D conversion section 206 (equal to or lower than 0 [LSB]), so the analog shaded signal A2 is A/D converted after a predetermined offset being added thereto.

Subsequently, the digital output signal D (the digital video output signal D1 and the digital shaded output signal D2) generated from the A/D conversion section 206 is stored in the memory 207.

The digital shaded output signal D2 stored in the memory 207 is processed by the noise determination section 209 in the CPU 208.

The noise determination section 209 processes the digital shaded output signal D2, and inputs a data average value obtained in consideration of the offset as a noise level Na.

Moreover, the digital video output signal D1 stored in the memory 207 is processed by the brightness measuring section 210 in the CPU 208.

The brightness measuring section 210 processes the digital video output signal D1 to measure the brightness of the predetermined region W (see FIG. 3) of the subject (e.g., the road surface 310), and outputs the brightness average value Ra.

The target value setting section 211 sets the black level target value Sa based on the brightness average value Ra from the brightness measuring section 210 and the noise level Na from the noise determination section 209.

That is, as shown in FIG. 5, the noise level Na based on the data from the shaded pixel portion 202 is calculated in the noise determination section 209, and the brightness average value Ra for the predetermined region W of the road surface 310 is calculated in the brightness measuring section 210. Both of the calculation results are input to the target value setting section 211.

Hereinafter, the addition circuit 211a in the target value setting section 211 calculates the sum of the brightness average value Ra of the road surface 310 and the noise level Na based on the data from the shaded pixel portion 202 as the black level target value Sa, and the D/A conversion circuit 212a in the black level setting section 212 converts the black level target value Sa into the black level BL of an analog voltage. The subtraction circuit 205 inputs the analog output signal B of the signal processing section 204 subtracted by the black level BL to the A/D conversion section 206.

In addition, in a general image sensor, the analog video signal A1 is converted into the analog output signal B by the signal processing section 204, which is further converted into the digital output signal D by means of the A/D conversion section 206, as shown in FIG. 6, after being corrected by the black level BL in such a manner that the average value of the shaded pixel output of the signal 400 becomes the reference potential 402 for A/D conversion.

That is, as indicated by the signal 402 in FIG. 6, the A/D conversion processing is executed after the black level BL (the D/A conversion value of the black level target value Sa) is subtracted from the output value (the analog output signal B) of the signal processing section 204.

Here, note that in FIG. 1, the memory 207 may be included in the function of the CPU 208, and the image processing function of the brightness measuring section 210 may be provided in a specific or special purpose IC outside of the CPU 208.

Also, the image processing apparatus 100 is shown as being installed on the vehicle 110 so as to take a picture of the forward direction of the vehicle 110, as illustrated in FIG. 2, but it may be installed on the vehicle 110 so as to take a picture of the rearward or side direction of the vehicle 110.

Here, a specific description will be given to a problem generated in the output signal level of an image processing apparatus with an image sensor that performs a general black level correction with reference to FIGS. 7 through 9 while taking, as an example, the case of a picked-up image forward of a road on which a vehicle with the apparatus installed thereon is traveling.

Figures 7A, 7B, 7C:
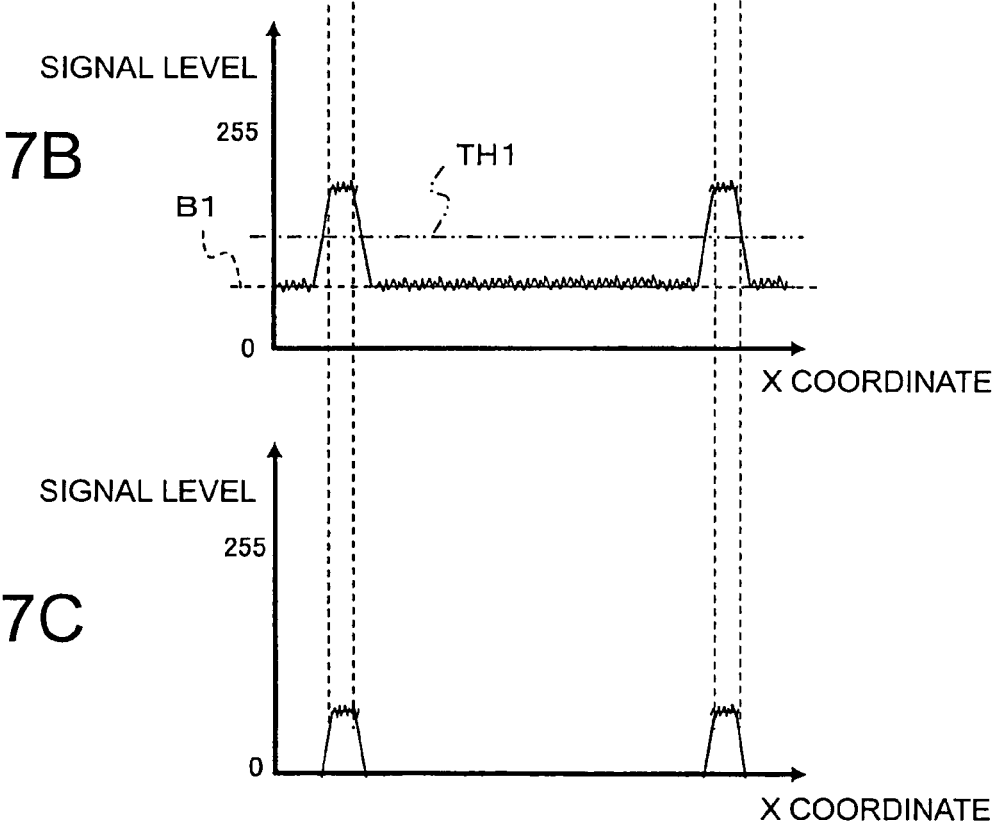
FIG. 7 is an explanatory view showing a relation between a general output video image and a video signal level related to the image processing apparatus according to the first embodiment of the present invention.
Figure 8A:
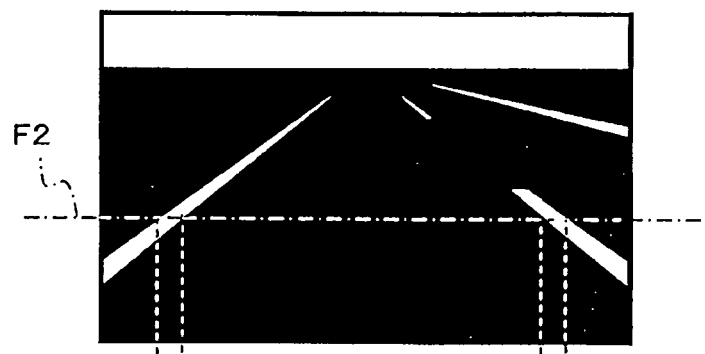
FIG. 8 is an explanatory view showing another relation between the general output video image and the video signal level related to the image processing apparatus according to the first embodiment of the present invention.
Figure 8B:
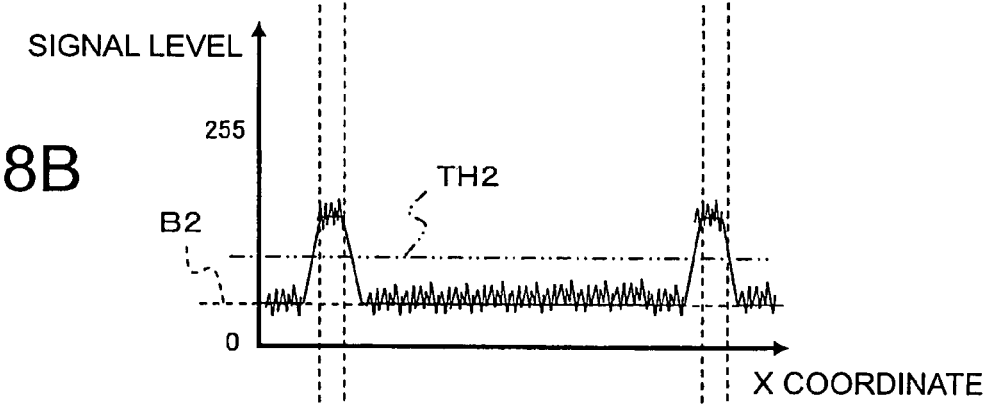
Figure 8C:
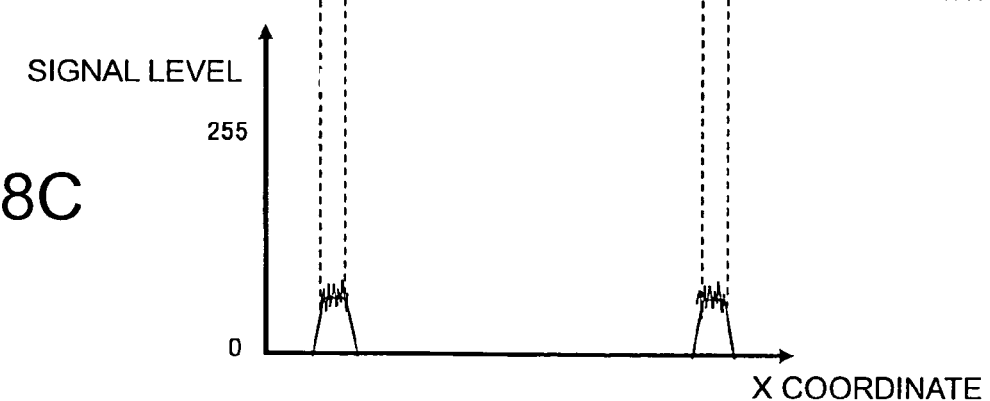
Figure 9A:
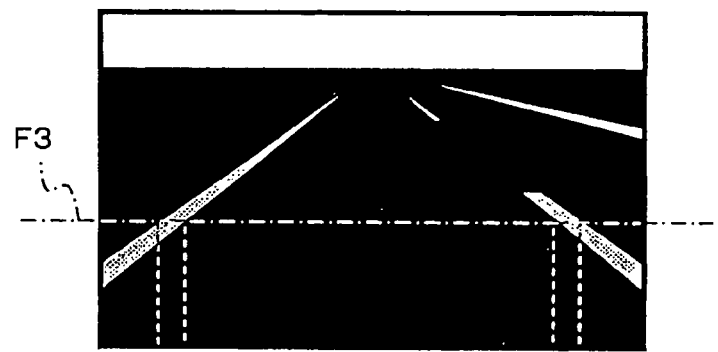
FIG. 9 is an explanatory view showing a further relation between a general output video image and the video signal level related to the image processing apparatus according to the first embodiment of the present invention.
Figure 9B:
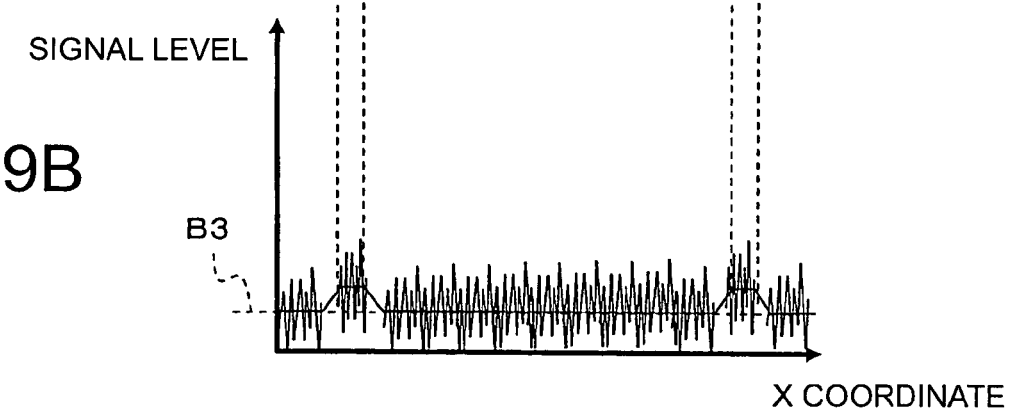

FIGS. 7 through 9 are explanatory views illustrating video images and signal levels acquired by the general image processing apparatus, in which FIG. 7A, FIG. 8A and FIG. 9A show video images with the different gains G of a signal processing section 204 (see FIG. 1), respectively; FIG. 7B, FIG. 8B and FIG. 9B show the signal levels of digital output signals D on video scan lines F1-F3 (see alternate long and short dash lines); and FIG. 7C and FIG. 8C show the results of white line recognition after the digital signal processing thereof.

In FIG. 7 through FIG. 9, video images (a), digital processing results (b) and white line extraction result (c) are shown as corresponding to one another, respectively.

In FIG. 7B, FIG. 8B and FIG. 9B, the signal levels B1, B2 and B3 represent the road surface brightness average values of the video images (FIG. 7B, FIG. 8B and FIG. 9B), respectively, obtained by a general brightness measuring section.

In addition, thresholds TH1, TH2 for extraction of white lines on the road surface are set with respect to the signal levels in FIG. 7B and FIG. 8B, respectively, whereby white lines of levels exceeding the respective thresholds TH1, TH2 are extracted, as shown in FIG. 7C and FIG. 8C.

In the image examples of FIG. 7A through FIG. 9A, the video image in FIG. 7A shows the case in which the brightness of the subject is relatively high, the gain G of the signal processing section 204 is a factor of 1, and the contrast between the road surface and the white lines is high, whereas the video images in FIG. 8A and FIG. 9A show the case in which the brightness of the subject is low so the gain G of the signal processing section 204 is greater than the factor of 1 and the S/N (signal to noise) ratio is low.

However, the video image in FIG. 8A shows the case in which the brightness of white lines is high and the contrast between the road surface and the white lines is high, whereas the video image in FIG. 9A shows the case that the brightness of white lines is low and the contrast between the road surface and the white lines is low.

Accordingly, in the respective video images in FIG. 7A and FIG. 8A, the contrast between the white lines and the road surface is high and hence the thresholds TH1, TH2 for extraction of white lines can be easily set, so that the white lines can be extracted in an easy manner, as shown in FIG. 7C and FIG. 8C.

However, in the video image in FIG. 9A, the noise level is very large, as shown in FIG. 9B, so it is difficult to set these thresholds. Accordingly, it is very difficult to extract white lines. In other words, as the noise level increases, the more complicated does image processing become, the longer does the processing time become, and the more difficult does accurate white line recognition become.

Here, when focusing attention to data from the shaded pixel portion 202, the data from the shaded pixel portion 202 passes the same circuit (the signal processing section 204 and the A/D conversion section 206 in FIG. 1) as that which data from the effective pixel portion 201 passes, so the state of the noise level in this case is the same with the data from the effective pixel portion 201 if the brightness information of the subject is excluded.

Accordingly, it is possible to easily determine the noise level by detecting the amount of noise by using the data (the digital shaded output signal D2) from the shaded pixel portion 202 in the noise determination section 209 in the CPU 208, as in the first embodiment (see FIG. 1) of the present invention.

Moreover, the target value setting section 211, the black level setting section 212 and the subtraction circuit 205 serve to set the black level BL by using the sum (the black level target value Sa) of the noise level Na and the result of the brightness measurement of the road surface (the brightness average value Ra), and correct the analog output signal B by subtracting the black level BL therefrom.

Figure 10A:
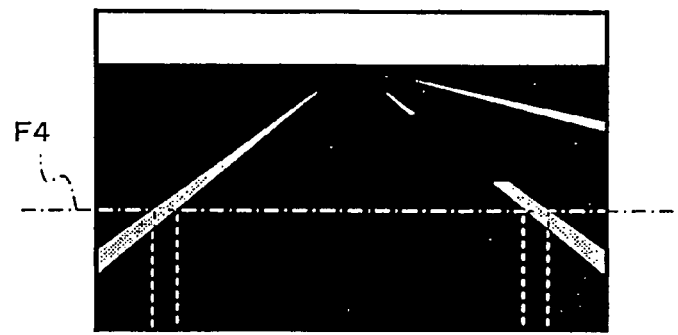
FIG. 10 is an explanatory view showing the relation between the output video image and the video signal level after the black level is set by the image processing apparatus according to the first embodiment of the present invention.
Figure 10B:
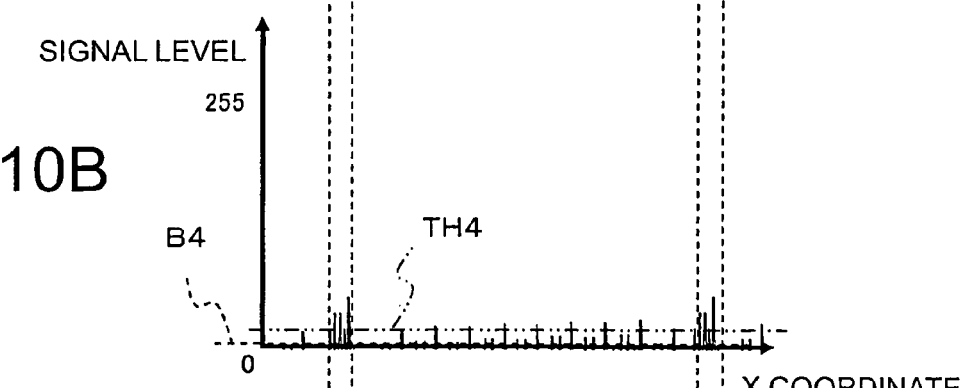

As a result, similar to FIG. 9A, with respect to the video image of low contrast in FIG. 10A, there can be obtained the digital processing result in which the noise level on a scan line F4 is almost removed, as shown in FIG. 10B.

In FIG. 10B, the signal level (brightness average value) B4 of the road surface is set substantially to "0 [LSB]" among 8 bits of "0-255".

Figure 10C:
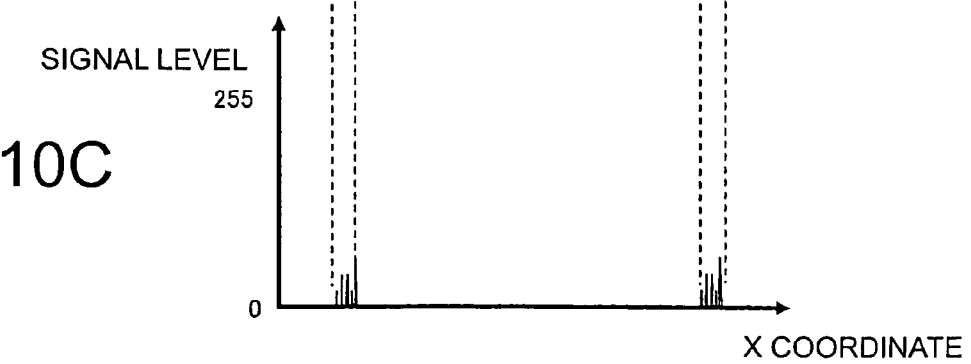

Accordingly, white lines can be easily extracted by using a threshold TH4 of a low level without the need of any complicated threshold processing, as shown in FIG. 10C.

For instance, no problem occurs in case where the gain is maximum in the night time in the presence of the pure white lines, as shown in FIG. 8A, when the black level becomes the same with respect to a video image with the gain G being maximum. However, in case where the gain is maximum in the night time in the presence of dirty, thin white lines, as shown in FIG. 10A, it is necessary to set the black level BL in such a manner as to be able to easily extract the white lines in consideration of not only the shaded pixel portion 202 but also the brightness of the video image of an object to be measured, as in the first embodiment of the present invention.

Now, reference will be made to white line recognition processing and black level setting processing according to the first embodiment of the present invention, as illustrated in FIG. 1, while referring to a flow chart in FIG. 11.

Figure 11:
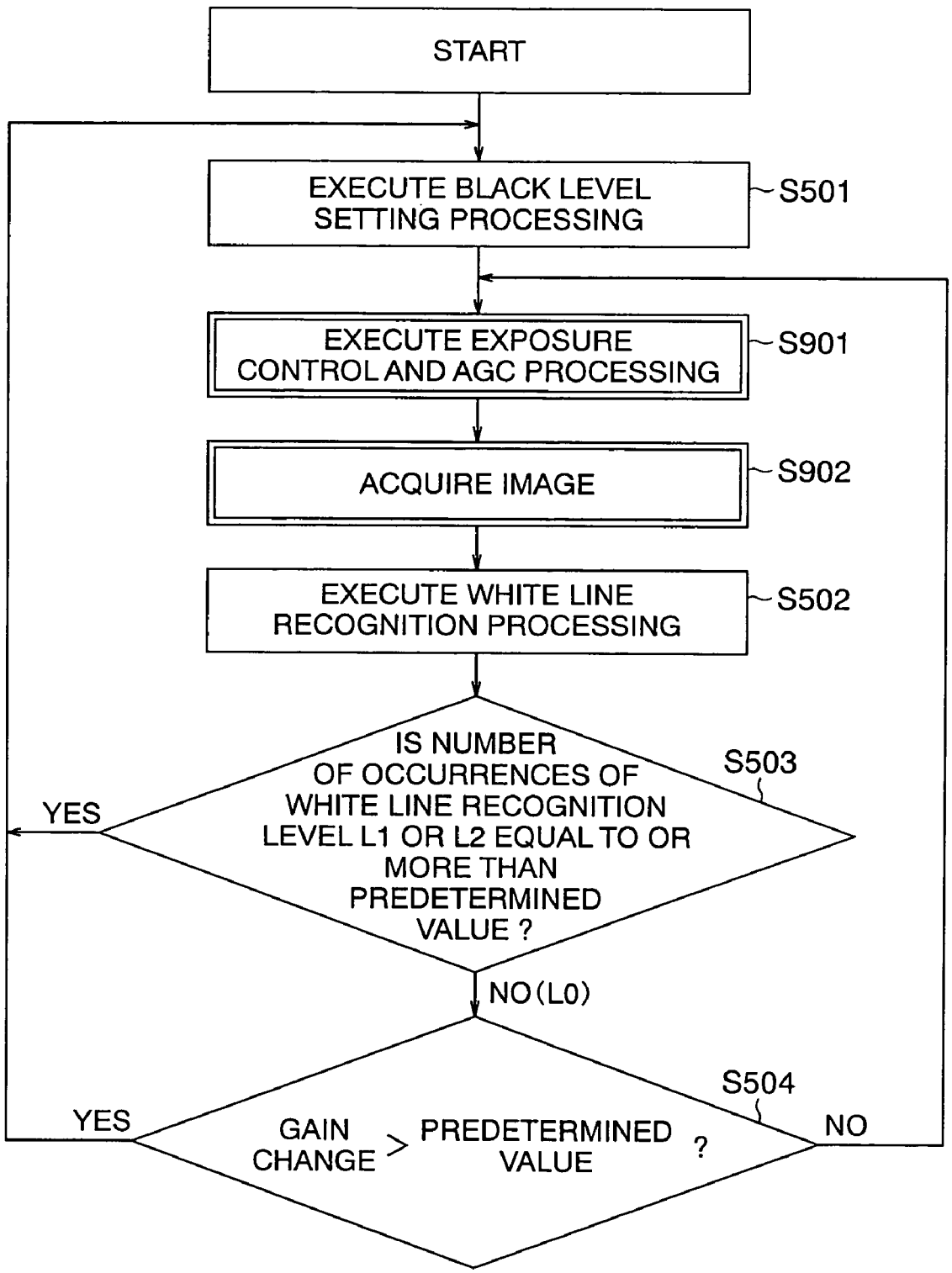
FIG. 11 is a flow chart illustrating a processing operation according to the first embodiment of the present invention.

In FIG. 11, the black level setting processing (step S501) corresponds to a series of processes including all the configuration blocks (see FIG. 1) from the QV conversion parts 201a, 202a of the effective pixel portion 201 and the shaded pixel portion 202 to the black level setting section 212.

Also, it is assumed that the white line recognition level determination section 208b in the CPU 208 includes a counter to count the number of occurrences of the ignorance or non-recognition of white lines.

In general, in the image processing apparatus, exposure control and AGC (Automatic Gain Control) processing are executed in accordance with the brightness of the subject (object to be sensed or picked up), so the brightness of the road surface 310 does not vary greatly in the above-mentioned first embodiment. In addition, the exposure control and the AGC processing (gain G) do not vary greatly under the same image pickup environment, and hence the above-mentioned black level setting processing need not be executed for each frame (there will of course be no problem even if it is executed for each frame).

In FIG. 11, first of all, after a picture taking operation is started, the black level setting section 212 executes black level setting processing (step S501). At this time, it is assumed that the initial value (e.g., 0 level) of the black level BL is set beforehand.

Subsequently, the AGC section 204a in the signal processing section 204 executes exposure control and AGC processing with respect to an analog signal A (step S901).

In addition, the A/D conversion section 206 converts an analog output signal B from the signal processing section 204 into a digital output signal D thereby to acquire an image, and stores it in the memory 207 (step S902).

Then, the white line recognition section 208a in the CPU 208 reads out the digital output signal D (digital video output signal D1 and digital shaded output signal D2) in the memory 207, and executes white line recognition processing (step S502).

Subsequently, the white line recognition level determination section 208b executes white line recognition level determination processing (step S503).

In step S503, as white line recognition levels, there are set three levels, i.e., a level "L0" with which white lines on a road surface at the opposite sides thereof can be recognized, a level "L1" with which a white line on the road surface at only one side can be recognized, and a level "L2" with which both of the white lines are lost sight of, whereby stepwise level determinations are carried out so as to determine, by referring to a counter value, whether the number of occurrences of the level "L1" or "L2" indicating the ignorance or non-recognition state of a white line(s) has reached a predetermined value (frequency) or more.

When it is determined in step S503 that the number of occurrences (frequency) of level "L1" or "L2" is equal to or more than the predetermined value (frequency) (that is, YES), it is assumed that the black level BL for determining the white line recognition level is inappropriate (white line recognition is in an insufficient state), a return is carried out to step S501 where black level setting processing according to the CPU 208 and the black level setting section 212 is executed again with respect to the following video frame.

Here, note that the reason to determine the state of white line ignorance or non-recognition over the predetermined number of times is to give redundancy to the determination results of the ignorance or non-recognition state so as to avoid an unnecessary re-setting processing of the black level BL based on an incorrect determination due to the influence of temporary noise, etc.

On the other hand, when it is determined that the number of occurrences of the level "L1" or "L2" is less than the predetermined value (frequency) and hence the white line recognition level is the level "L0" (that is, NO), it is assumed that the black level BL is appropriate (in a state capable of white line recognition), and the control flow proceeds to step S504.

In step S504, in order to verify the change of the AGC processing in the AGC section 204a, the CPU 208 determines, on the basis of the level of the digital output signal D, whether the amount of change of the gain G is larger than a predetermined value.

When it is determined as the gain change>the predetermined value in step S504 (that is, YES), it is assumed that the change of the gain G is very large (in a state in which the signal level is greatly influenced by the noise level Na), so a return is carried out to step S501, and the black level setting processing (step S501) is executed again.

On the other hand, when it is determined as the gain variation≦the predetermined value in step S504 (that is, NO), the change of the gain G is relatively small so a return to the white line recognition processing (step S901) is carried out. At this time, the black level setting processing (step S501) is not executed.

In the black level setting processing (step S501), the noise determination section 209 in the CPU 208 obtains the noise level Na from the digital shaded output signal D2, and the brightness measuring section 210 measures the brightness average value Ra of the object to be sensed or picked up in the predetermined region W from the digital video output signal D1, whereby the target value setting section 211 sets the black level target value Sa (=Na+Ra) by using the brightness average value Ra and the noise level Na.

Moreover, the black level setting section 212 obtains the black level BL by D/A converting the black level target value Sa, and the subtraction circuit 205 corrects the analog output signal B from the signal processing section 204 by subtracting the black level BL therefrom.

Thus, with the provision of the noise determination section 209, the brightness measuring section 210, the target value setting section 211 and the black level setting section 212, it is possible to set an optimal black level BL corresponding to image processing by setting the black level target value Sa and the black level BL based on the noise level Na and the brightness average value Ra of the subject particularly without adding an expensive circuit and increasing the size of arithmetic calculations. Accordingly, the image processing apparatus that is immune to the influence of noise can be constructed, and the setting processing of the black level BL can be simplified.

In addition, the black level BL can be set in accordance with the purpose of image processing, and the black level can also be set in real time based on a determination criteria according to the change of the gain G in the AGC section 204a, so video images suitable for image processing can be obtained.

In particular, in case where the present invention is applied to an on-board device that takes a picture of the forward, the side or the rearward direction of the vehicle 110 (see FIG. 2), it is possible to achieve the recognition of white lines based on the optimal black level BL while following a subject that is changing every moment in accordance with traveling of the vehicle 110.

In this case, the brightness measuring section 210 measures the brightness of the road surface in the forward, the side or the rearward direction of the vehicle 110, and the target value setting section 211 sets the sum of the road surface brightness and the noise level Na as an offset value from the black level target value Sa to a negative side, and also sets the value corrected by the offset value as the black level target value Sa. As a result, in case of the analog shaded signal A2 of a low intensity level, the black level target value Sa will never be out of the A/D conversion range of the A/D conversion section 206, thus making it possible to obtain the digital output signal D.

Moreover, although in the first embodiment of the present invention, the noise determination section 209 determines the noise level Na from the digital shaded output signal D2 based on the electric charge of the shaded pixel portion 202, it is possible to determine the noise level Na in the predetermined region W of the subject, for example, from the digital video output signal D1 based on the electric charge of the effective pixel portion 201. At this time, the predetermined region W to be processed by the noise determination section 209 and the brightness measuring section 210 is set to a road surface region at a predetermined distance in the forward, the side or the rearward direction of the vehicle 110.

Further, provision is made for the white line recognition section 208a for recognizing the white lines 311 within a road surface region based on the digital output signal D and the white line recognition level determination section 208b for determining the white line recognition level of the white line recognition section 208a, and the white line recognition level determination section 208b carries out again the setting processing of the black level BL when a condition unable to recognize a white line has occurred more than a predetermined number of times. With such an arrangement, even if the state of temporary white line ignorance or non-recognition occurs, unnecessarily re-setting processing of the black level BL can be avoided.

Furthermore, although reference has been made to the case where the image processing apparatus installed on the vehicle 110 is taken as an example with the effective pixel portion 201 and the shaded pixel portion 202 serving to take a picture of the forward, the side or the rearward direction of the vehicle 110, it is needless to say that the present invention can be applied to as image processing apparatuses of other uses or purposes, while providing the operational effects equivalent to the above-mentioned.

Embodiment 2

Figure 12:
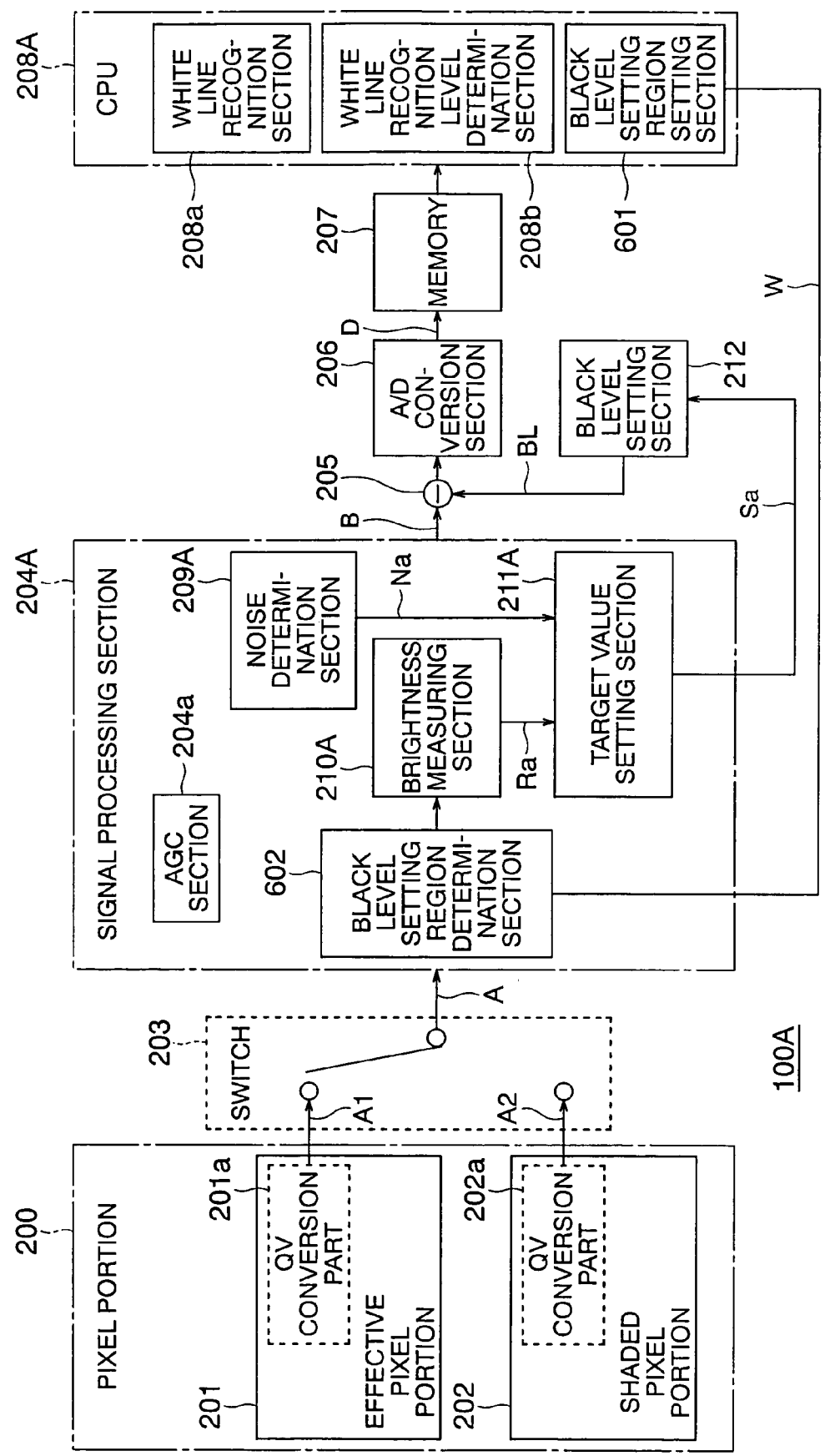
FIG. 12 is a flow chart illustrating a processing operation according to a second embodiment of the present invention.

In the above-mentioned first embodiment (see FIG. 1 and FIG. 5), the noise determination section 209, the brightness measuring section 210 and the target value setting section 211 are provided in the CPU 208, and the black level target value Sa is set based on the digital output signal D, but as shown in FIG. 12, a noise determination section 209A, a brightness measuring section 210A and a target value setting section 211A may be provided in a signal processing section 204A, and the black level target value Sa may be set based on an analog signal A or an analog output signal B.

Hereinafter, reference will be made to an image processing apparatus according to a second embodiment of the present invention while referring to FIG. 12.

FIG. 12. is a block diagram that illustrate the schematic configuration of the image processing apparatus according to the second embodiment of the present invention, wherein the same parts or components. It as those described above (see FIG. 1) are identified by the same symbols or by the same symbols with "A" affixed to their ends, while omitting a detailed explanation thereof.

In this case, the noise determination section 209A, the brightness measuring section 210A and the target value setting section 211A arranged in the signal processing section 204A serves to execute processing based on the analog output signal B.

In addition, the signal processing section 204A includes a black level setting region determination section 602 that determines a setting target region of the black level BL in association with the brightness measuring section 210A.

Also, a CPU 208A includes a black level setting region setting section 601 that sets a black level setting target region in association with the black level setting region determination part 602.

The black level setting region determination section 602 determines the inside and outside of the setting target region of the black level BL based on a synchronization signal that it commonly used by the black level setting region setting section 601.

The black level setting region setting section 601 sets the above-mentioned predetermined region W (see FIG. 3) as a black level setting region, and inputs it to the black level setting region determination section 602, whereby the brightness measuring section 210A measures a brightness average value Ra in the predetermined region W.

The noise determination section 209A determines the noise level Na from the analog output signal B based on the analog shaded signal A2 from the shaded pixel portion 202, and the brightness measuring section 210A measures the brightness average value Ra of the predetermined region W of the subject based on the analog output signal B.

Hereinafter, similarly as stated above, the target value setting section 211A sets the black level target value Sa for the analog output signal B based on the noise level Na and the brightness average value Ra, and the black level setting section 212 sets the black level BL based on the black level target value Sa. Also, the A/D conversion section 206 converts the analog output signal B corrected based on the black level BL into a digital output signal D.

Here, note that in this case, too, the predetermined region W (see FIG. 3) can be made, based on the analog video signal A1, an object or target to be processed by the noise determination section 209A and the brightness measuring section 210A, so that the noise level Na and the brightness average value Ra of the road surface can be calculated based on the data of the shaded pixel portion 202.

Moreover, although the noise determination section 209A and the brightness measuring section 210A execute the processing based on the analog output signal B, they may execute the processing based on the analog signal A.

As described above, the image processing apparatus according to the second embodiment of the present invention includes the noise determination section 209A that determines or identifies the noise level Na from the analog output signal B, the brightness measuring section 210A that measures the brightness average value Ra in the predetermined region W of the subject from the analog output signal B, the target value setting section 211A that sets the black level target value Sa for the analog output signal B based on the noise level Na and the brightness average value Ra, and the black level setting section 212 that sets the black level BL for the analog output signal B based on the black level target value Sa, wherein the A/D conversion section 206 converts the analog output signal B corrected based on the black level BL into the digital output signal D. With this arrangement, the A/D conversion processing and the storage of data from the shaded pixel portion 202 can be made unnecessary, and the noise determination section 209, the brightness measuring section 210 and the target value setting section 211 (see FIG. 1) in the CPU 208A can also be made unnecessary. In addition, the black level BL can be set in real time by making a noise determination by the use of the analog video signal A1.

Moreover, the noise determination section 209A can determine not only the noise level Na based on the analog shaded signal A2 from the shaded pixel portion 202 but also the noise level Na of the predetermined region W of the subject based on the analog video signal A1 from the effective pixel portion 201.

Embodiment 3

Although in the above-mentioned first and second embodiments, the noise level Na is determined based on the data from the shaded pixel portion 202, it may be obtained based on the video signal in the predetermined region W from the effective pixel portion 201.

Hereinafter, reference will be made to a third embodiment of the present invention in which the noise level Na is set based on the video signal in the predetermined region W.

The schematic configuration of an image processing apparatus according to the third embodiment of the present invention is as shown in FIG. 1 for example, or the configuration (noise determination section 209A) of FIG. 12 may also be used for this purpose.

However, note that this embodiment is different from the above-mentioned ones in that the noise determination section 209 calculates the noise level Na not based on data (digital shaded output signal D2) from the shaded pixel portion 202 but based on a video signal (digital video output signal D1) in the predetermined region W (see FIG. 3) from the effective pixel portion 201, as in the case of the brightness measuring section 210.

Here, a formula for calculation of the noise level Na based on the video signal (the digital video output signal D1) will be specifically described.

In general, the noise level Noise [LSB] is calculated according to the following expression (1).

$$\text{Noise } [LSB] = \frac{2}{(wv1 + wv0 + 1)} \frac{1}{100} \sum_{V=wv0}^{wv1} \cdot \sum_{H=271}^{370} |R(H, V) - Ra(W)| \quad (1)$$

where coordinates of an image are represented by horizontal and vertical coordinates (H, V) with starting V coordinates of the predetermined region W being wv0 and end V coordinates of the predetermined region W being wv1. Also, it is assumed that the brightness value of the pixel (H, V) is represented by R (H, V), and the brightness average value in the predetermined region W is represented by Ra (W).

Next, reference will be made to the operation of this third embodiment of the present invention while referring to FIGS. 1 through 3 and FIG. 13.

Figure 13:
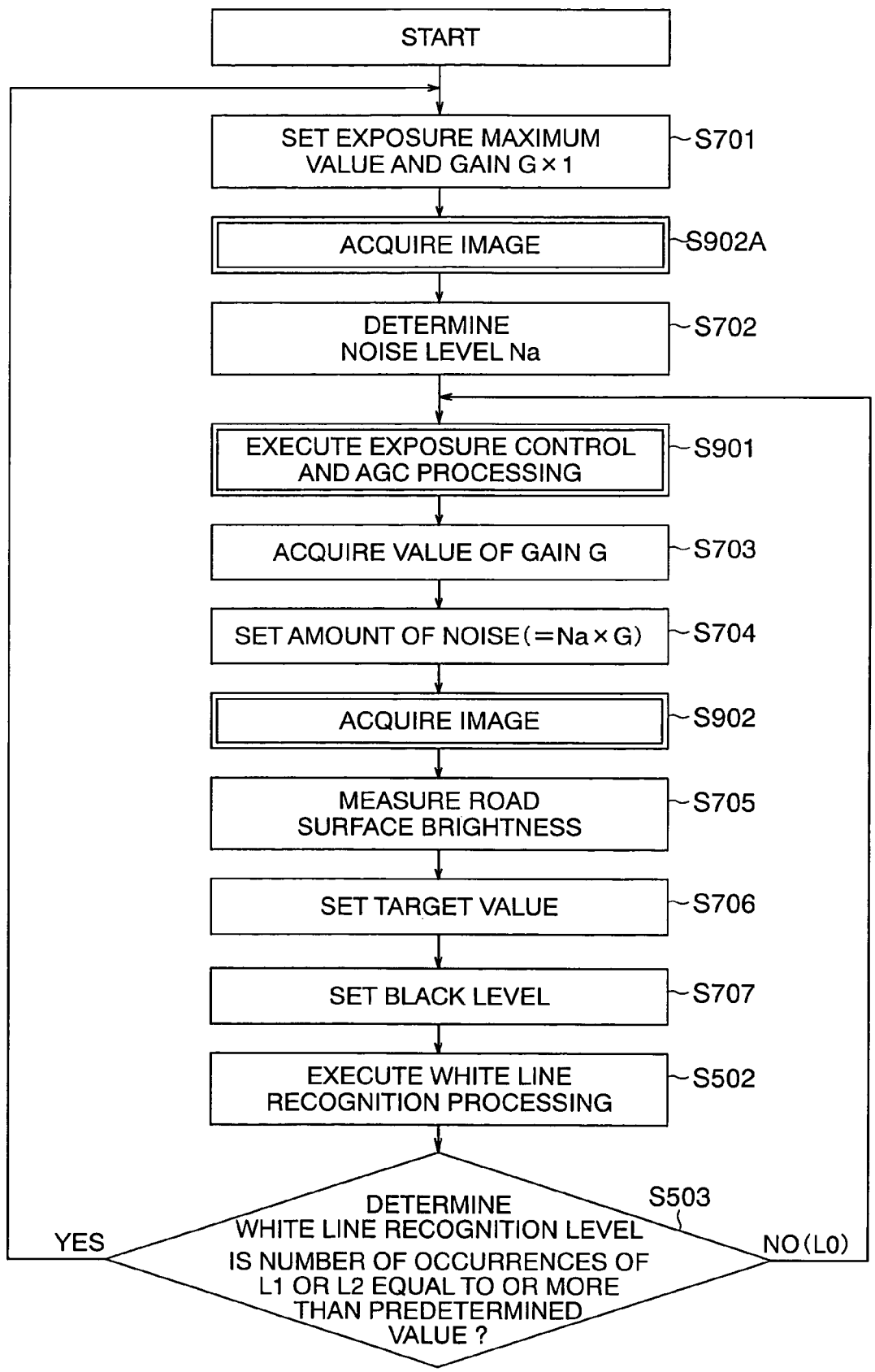
FIG. 13 is a flow chart illustrating a processing operation according to a third embodiment of the present invention.

FIG. 13 is a flow chart that shows the operations of the CPU 208 (the white line recognition section 208a, the white line recognition level determination section 208b, the noise determination section 209 and the target value setting section 211) and the black level setting section 212 (see FIG. 1) according to the third embodiment of the present invention, wherein steps S901, S902, S502 and S503 are the same processes similar to the above-mentioned ones (see FIG. 11).

As stated above, in the image processing apparatus, exposure control and AGC processing are executed in accordance with the brightness of the subject (object to be sensed or picked up), so the brightness of the road surface 310 does not vary greatly in this case, too. In addition, the exposure control and the AGC processing (gain G) do not vary greatly under the same image pickup environment, and hence the setting processing of the black level BL need not be executed for each frame.

However, in this third embodiment of the present invention, the processing flow shown in FIG. 13 is executed so as to calculate the noise level Na based on the brightness data of the road surface 310.

In FIG. 13, first of all, after start of a picture taking or pickup operation, the signal processing section 204 sets the amount of exposure control to a maximum value, and the gain G to a factor of 1 (G×1) (step S701), whereby an image is acquired (step S902A).

Subsequently, the noise determination section 209 determines (calculates) the noise level Na based on the above expression (1) (step S702).

Thereafter, the signal processing section 204 executes the exposure control and the AGC processing (step S901), and the noise determination section 209 acquires the value of the gain G (step S703), calculates and sets the amount of noise (specifically, Na×G) from the noise level Na calculated in the above step S702 in consideration of the AGC (gain G) (step S704).

Then, the brightness measuring section 210 acquires an image (step S902) and measures the road surface brightness therefrom (step S705), after which the target value setting section 211 sets the black level target value Sa (step S706), and the black level setting section 212 sets the black level BL (step S707).

Here, note that in the measurement processing of the road surface brightness (step S705), the above expression (1) used in the calculation process of the noise level Na according to the noise determination section 209 may be employed.

Thereafter, the white line recognition section 208a executes white line recognition processing (step S502), and the white line recognition level determination section 208b executes white line recognition level determination processing (step S503).

In step S503, similarly as stated above, three step levels including the level "L0" (capable of recognizing white lines on the road surface at opposite sides thereof), the level "L1" (capable of recognizing a white line on the road surface at one side thereof), and the level "L2" (losing sight of white lines on the road surface at opposite sides thereof) are determined.

When it is determined in step S503 that the number of occurrences of the level "L1" or "L2" is equal to or greater than a predetermined value (that is, YES), the black level BL is inappropriate (in a state incapable of recognizing a white line), so a return to step S701 is carried out, and the above-mentioned processing is repeated to set the black level BL again.

On the other hand, when it is determined in step S503 that the number of occurrences of the level "L1" or "L2" is less than the predetermined value and hence the white line recognition level is the level "L0" (that is, NO), the black level BL is appropriate (in a state capable of white line recognition), and a return is performed to the white line recognition processing in step S901 and onward.

Therefore, the black level BL can be set in accordance with image processing, similarly as described above.

Embodiment 4

Although in the above-mentioned third embodiment (see FIG. 13), the noise level Na is obtained based on the video signal (digital video output signal D1) (step S702) and the amount of noise is then set (step S704), the amount of noise may be determined (set) in real time in accordance with the gain G.

Hereinafter, reference will be made to a fourth embodiment of the present invention in which the amount of noise is said in real time in accordance with the gain G.

The schematic configuration of an image processing apparatus according to the fourth embodiment of the present invention is as shown in FIG. 1 for example, or the configuration (noise determination section 209A) of FIG. 12 may also be used for this purpose.

In addition, the brightness, measuring section 210 makes the predetermined region W (see FIG. 3) an object or target to be measured. However, note that what is different from the above-mentioned ones is that the noise determination section 209 sets the amount of noise based on the gain G of an AGC section 204a in the signal processing section 204. In other words, the noise determination section 209 does not calculate the noise level Na as stated above, but calculates in real time the amount of noise from the gain G based on a table (correspondence table between the gain G and the amount of noise) that is held beforehand.

Figure 14:
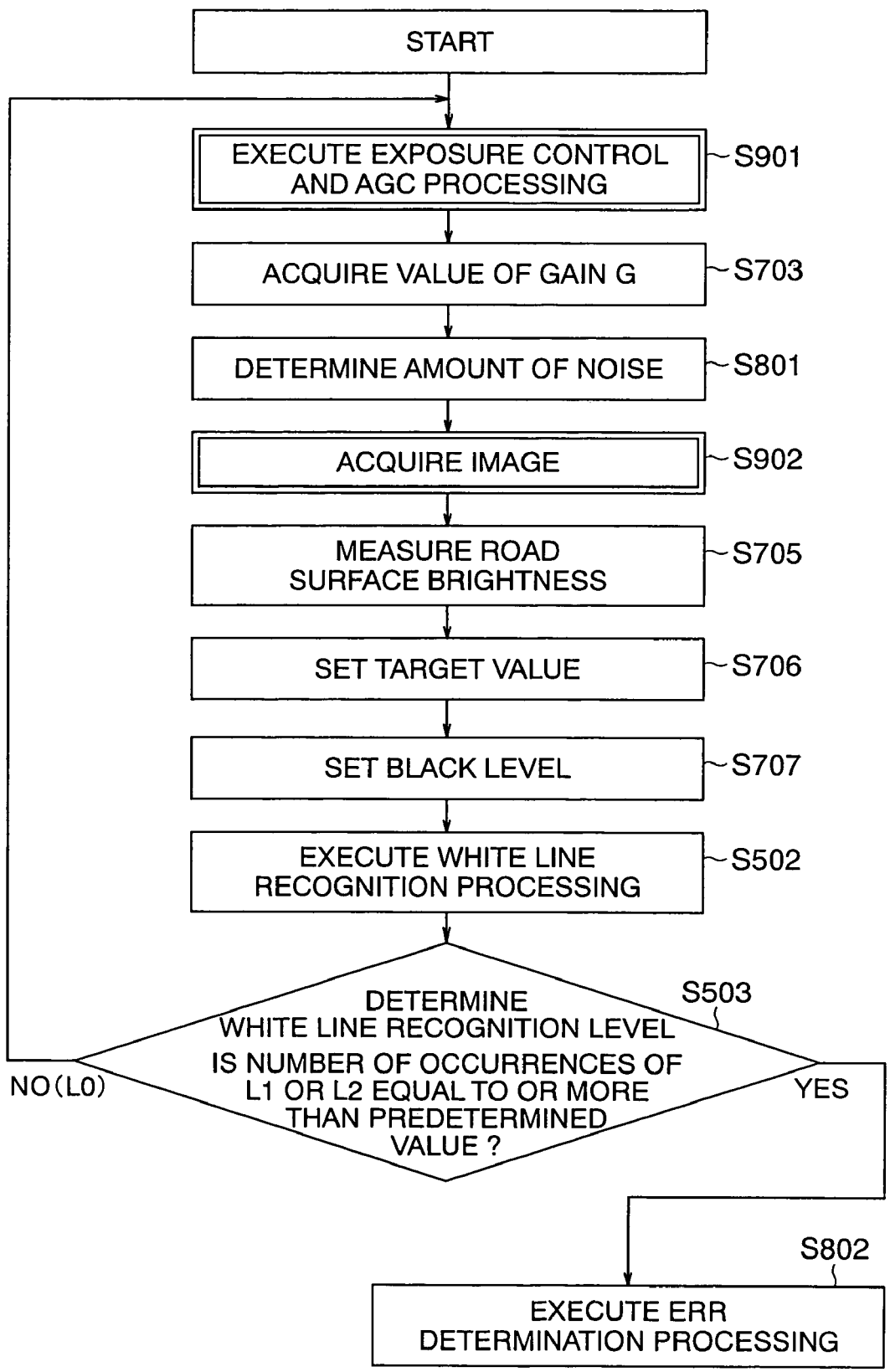
FIG. 14 is a flow chart illustrating a processing operation according to a fourth embodiment of the present invention.

FIG. 14 is a flow chart that shows an operation according to the fourth embodiment of the present invention, wherein white line recognition processing, noise determination processing, black level setting processing and the like are illustrated. In FIG. 14, steps S901, S902, S703, S705 through 707, S502 and S503 are the same processes similar to the above-mentioned ones (see FIG. 13).

As stated above, in the image processing apparatus, exposure control and AGC processing are executed in accordance with the brightness of the subject (object to be sensed or picked up), so the brightness of the road surface 310 does not vary greatly in this case, too. In addition, the exposure control and the AGC processing (gain G) do not vary greatly under the same image pickup environment, and hence the setting processing of the black level BL need not be executed for each frame.

However, in the fourth embodiment of the present invention, in order to refer to the correspondence table between the gain G of the AGC section 204a and the amount of noise, the noise determination section 209 executes a processing flow shown in FIG. 14.

As shown in FIG. 14, first of all, the exposure control and the AGC processing are executed after the start of a picture taking or pickup operation (step S901), so that the gain G is acquired (step S703).

Subsequently, the amount of noise is determined from the value of the gain G by referring to the correspondence table between the gain G and the amount of noise (step S801).

Although the correspondence table between the gain G and the amount of noise is described as being beforehand held in the noise determination section 209, a table of the amounts of noise corresponding to the respective values of the gain G may be created by using data from the shaded pixel portion 202 for instance immediately after the start of the picture taking operation, and then held in the memory in the CPU 208 or the like.

Hereinafter, an image is acquired similarly as stated above (step S902), so that the road surface brightness is measured (step S705) and the black level target value Sa is set (step S706). Then, the black level BL is set (step S707), so that the white line recognition processing is executed (step S502) and the white line recognition level determination processing is executed (step S503).

When it is determined in step S503 that the number of occurrences of the level "L1" or "L2" is equal to or greater than the predetermined value (that is, YES), ERR (error) determination processing is executed to shut down the system (step S802), whereas when it is determined in step S503 that the white line recognition level is in the level "L0" (that is, NO), a return to step S 901 is performed, and the white line recognition processing is repeated. However, in case where the correspondence table between the gain G and the amount of noise is created immediately after the start of the picture taking operation, as stated above, a return to table creation processing (not shown) may be carried out.

Accordingly, similarly as stated above, the black level BL can be set in accordance with image processing, and at the same time, the processing can be simplified.

Although in the above-mentioned first through fourth embodiments, reference has been made, as an example, to the case where the black level BL with respect to the analog output signal B is set so that the analog output signal B is corrected based on the black level BL, the black level with respect to the digital output signal D may be set so that the digital output signal D after being A/D converted can be corrected based on the black level. It is needless to say that operational effects equivalent to those as stated above can be obtained in this case, too.

In addition, although the brightness average value Ra is employed as the brightness information in the predetermined region W calculated by the brightness measuring sections 210, 210A, other brightness information may be used for the same purpose as far as such information corresponds to the brightness of the subject.

While the invention has been described in terms of preferred embodiments, those skilled in the art will recognize that the invention can be practiced with modifications within the spirit and scope of the appended claims.

What is claimed is:

1. An image processing apparatus comprising:
an effective pixel portion that accumulates an amount of first electric charge corresponding to an intensity of incident light from a subject;
a shaded pixel portion that accumulates an amount of second electric charge, where the incident light is shaded from the subject;
a QV conversion part or parts operative to convert said first and second electric charges into analog signals, respectively;
a signal processing section that processes said analog signals to generate an analog output signal;
an A/D conversion section that converts said analog output signal into a digital output signal;
a noise determination section that determines a noise level from said digital output signal;
a brightness measuring section that measures brightness information in a predetermined region of said subject from said digital output signal based on said first electric charge;
a target value setting section that sets a black level target value for said analog output signal or said digital output signal based on said noise level and said brightness information; and
a black level setting section that sets a black level for said analog output signal or said digital output signal based on said black level target value;
wherein said analog output signal or said digital output signal is corrected based on said black level.

2. The image processing apparatus as set forth in claim 1, wherein said noise determination section determines said noise level in said digital output signal based on said second electric charge corresponding to the incident light shaded from the subject.

3. The image processing apparatus as set forth in claim 1, wherein said noise determination section measures a noise level in said predetermined region of said subject from said digital output signal based on said first electric charge.

4. The image processing apparatus as set forth in claim 1, wherein said signal processing section includes an AGC section that amplifies said analog signal; and
said noise determination section determines said noise level based on a determination criteria set in accordance with a gain of said AGC section.

5. The image processing apparatus as set forth in claim 1, wherein said effective pixel portion and said shaded pixel portion are installed on a vehicle for taking a picture of a forward, a rearward or a side direction of said vehicle.

6. The image processing apparatus as set forth in claim 5, wherein said predetermined region is set to a road surface region at a predetermined distance in a forward, a rearward or a side direction of said vehicle.

7. The image processing apparatus as set forth in claim 5, wherein said brightness measuring section measures the brightness of a road surface in the forward, the rearward or the side direction of said vehicle as said brightness information; and
said target value setting section sets a sum of said road surface brightness and said noise level as an offset value in a negative side from a reference value of said black level, and further sets a value corrected by said offset value as said black level target value.

8. The image processing apparatus as set forth in claim 1, wherein said brightness measuring section measures a brightness average value as said brightness information.

9. The image processing apparatus as set forth in claim 1, wherein the A/D conversion section has a conversion range from 0 to a predetermined number, and
wherein all levels at or below the black level correspond to the 0 of the conversion range.

10. The image processing apparatus as set forth in claim 1, wherein the target value setting section sets the black level target value based on a sum of said noise level and said brightness information.

11. The image processing apparatus as set forth in claim 1, wherein said noise level and said brightness information are different inputs in the target value setting section.

* * * * *